(No Model.)
J. A. BLOMBERG.
COMBINED STOVE LID AND PAN LIFTER.
No. 590,509. Patented Sept. 21, 1897.
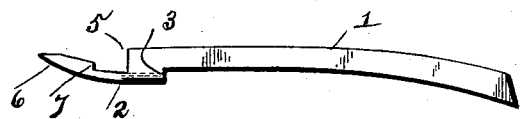
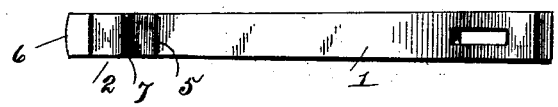
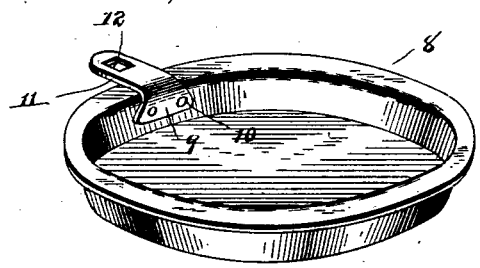
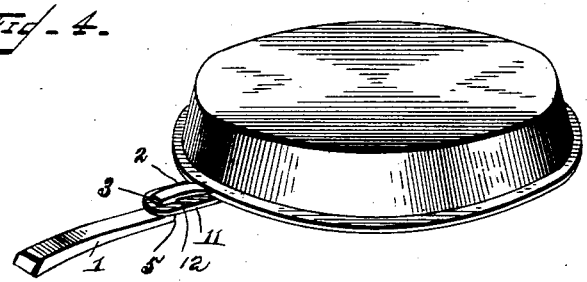
WITNESSES
Marcus L. Byng.
J. C. Tappan
INVENTOR,
John A. Blomberg.
by John Wedderburn
Attorney

UNITED STATES PATENT OFFICE.

JOHN A. BLOMBERG, OF BURDICK, KANSAS.

COMBINED STOVE-LID AND PAN LIFTER.

SPECIFICATION forming part of Letters Patent No. 590,509, dated September 21, 1897.

Application filed August 29, 1896. Serial No. 604,254. (No model.)

*To all whom it may concern:*

Be it known that I, JOHN A. BLOMBERG, a citizen of the United States, residing at Burdick, in the county of Morris and State of Kansas, have invented certain new and useful Improvements in a Combined Stove-Lid and Pan Lifter; and I do hereby declare the following to be a full, clear, and exact description of the invention, such as will enable others skilled in the art to which it appertains to make and use the same.

My invention relates to a combined stove-lid and pan lifter.

My object is to provide an exceedingly simple and cheap lifter which will be especially adapted for use in lifting pans or cooking utensils of any kind, and also for raising stove-lids.

Having this object in view, my invention consists of a handle of novel construction which by itself is adapted for use in raising stove-lids.

The invention further consists, in combination with a novel form of ear adapted for connection to a cooking vessel of an improved handle which is adapted for engagement with the ear, whereby the utensil can be raised and carried about, if desirable.

In the accompanying drawings, Figure 1 is a side elevation of my improved lifting-handle; Fig. 2, a plan view; Fig. 3, a perspective view showing a cooking utensil equipped with the ear, and Fig. 4 a bottom perspective view showing the handle in engagement with the ear.

Referring now to Figs. 1 and 2, the body of the handle is designated by the numeral 1, and this may be of any preferred construction. The end of the handle is formed into a head 2, which is provided with a rear shoulder 3, and is cut away at 4 to provide a second shoulder 5. The head of this handle is reduced at 6, so that a short shoulder 7 is also provided.

Referring now to Figs. 3 and 4. Here an ordinary cooking utensil is designated by the numeral 8. My improved ear consists of a depending portion 9, connected to the vessel by fastening devices 10, and an outwardly-bent horizontally-extending portion 11, which is provided with a square opening 12.

When it is desired to lift a stove-lid, the reduced forward end of the lifting-handle is inserted in the recess or opening in the lid, so that the rear shoulder of said head drops in the recess, and the lower portion of the handle itself rests against the top of the lid. The lid can now be lifted and carried to any desired point. When it is desirable to lift a pan or cooking utensil equipped with my improved ear, the head of the lifting-handle is inserted in the square opening of the ear until the forward end of said head abuts against the under side of the ear, and the two shoulders 3 and 5 are received in the opening. The pan can then be lifted.

The distance between shoulders 3 and 5 is approximately the same as the width of the square opening 12, so that this portion of the handle is adapted to fit snugly in said opening. The advantage of this construction is that there is practically no tendency for the handle to move relatively of the ear and become detached therefrom by virtue of the shoulder 3 coming out of said opening. The handle is practically as firm when attached to the ear as if it were directly connected to the pan. The short shoulder 7 is adapted to catch on the bottom of the ear if for any reason the portion of the handle defined by the shoulders 3 and 5 should come out of the opening. Said shoulder 7 is therefore adapted to prevent detachment of the handle from the ear when the devce is in use.

I am aware that it is not new, broadly, to employ a perforated ear connected to a pan and a handle having a portion adapted for reception in the perforation of the ear, whereby the pan may be lifted.

The advantage of my construction over prior devices of this kind resides in the portion defined by the shoulders 3 and 5 in connection with the forward reduced portion of the handle, so that it is practically impossible for the handle to become accidentally displaced. A further improvement resides in the shoulder 7, which constitutes a catch when used in connection with those portions just enumerated.

Slight and immaterial changes of construction might be resorted to without detracting from the advantages of my invention, and hence it is to be understood that I do not limit myself to the precise construction herein shown and described, but consider that I am entitled to all such variations as come within the spirit and scope of the invention.

Having thus described my invention, what I claim as new, and desire to secure by Letters Patent, is—

1. In a pan-lifter, the combination with a pan, of an ear connected to the same, which is provided with an outwardly-extending portion having a substantially square opening therein, and a handle which is provided with front and rear shoulders defining between them a portion of approximately the same size and shape as the opening aforesaid and adapted to fit therein and a forwardly-projecting reduced portion adapted to bear against the bottom of the ear.

2. In a pan-lifter, the combination with a pan, of an ear connected thereto which is provided with a horizontally-extending portion having a substantially square opening therein, and a handle provided with front and rear shoulders defining between them a portion of approximately the same size as the opening and adapted to fit therein and an outer reduced end provided with a cut-away portion and a shoulder adapted to serve as a catch to prevent detachment of the handle from the ear.

In testimony whereof I have signed this specification in the presence of two subscribing witnesses.

JOHN A. BLOMBERG.

Witnesses:
W. H. MOTT,
T. C. SUMNER.